Feb. 17, 1942.     J. F. CAMPBELL ET AL     2,273,464
METHOD OF SPLICING RUBBER ARTICLES
Original Filed Feb. 4, 1939     5 Sheets-Sheet 1

Inventors
John F. Campbell and
Jerome F. Ringlein

By

Attorney

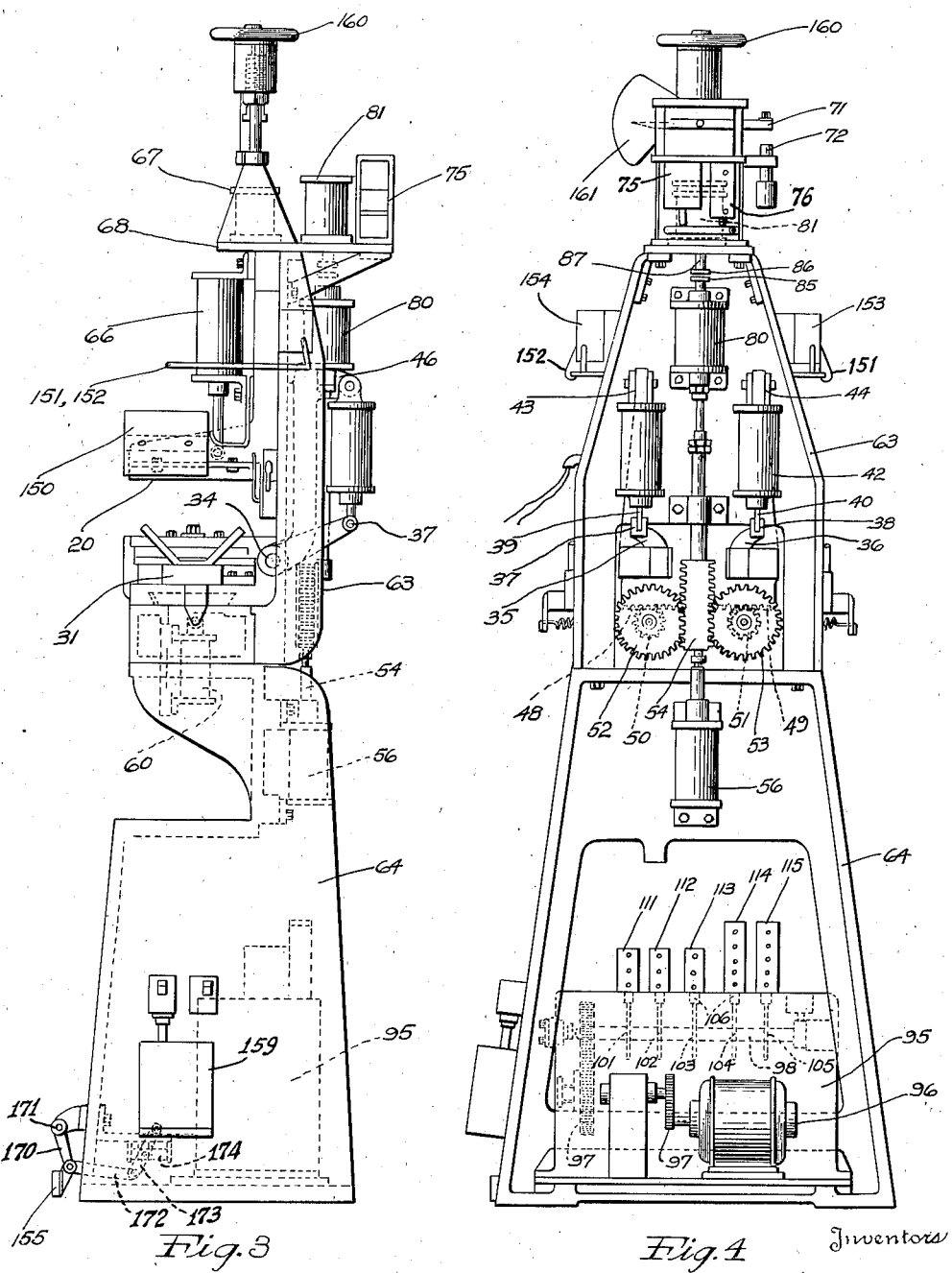

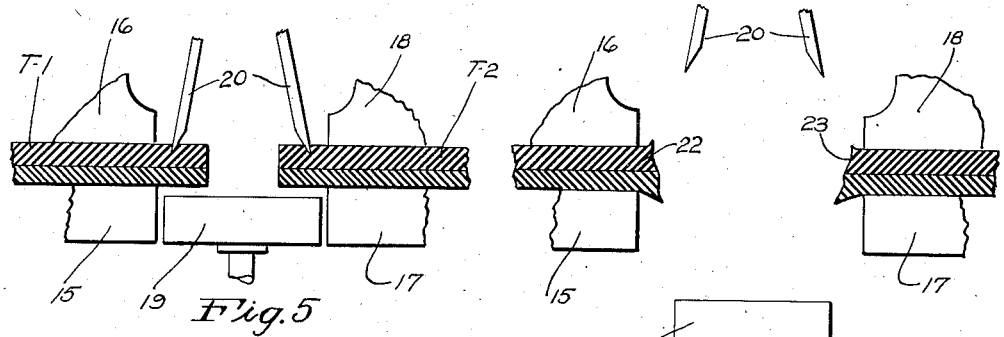
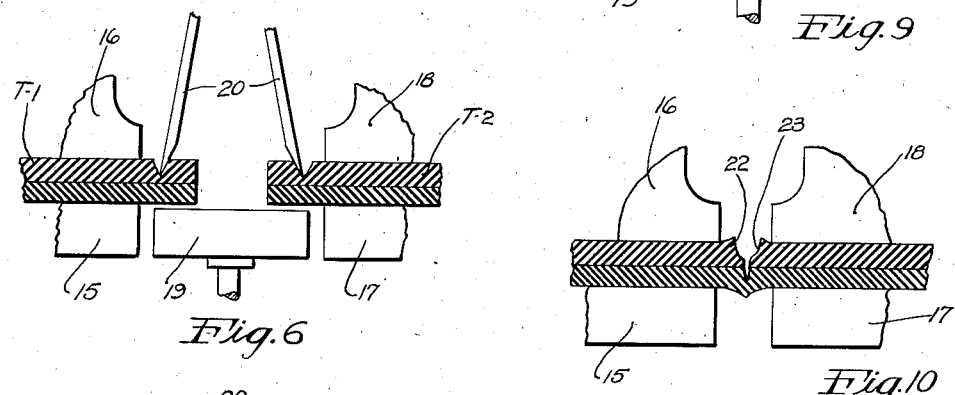
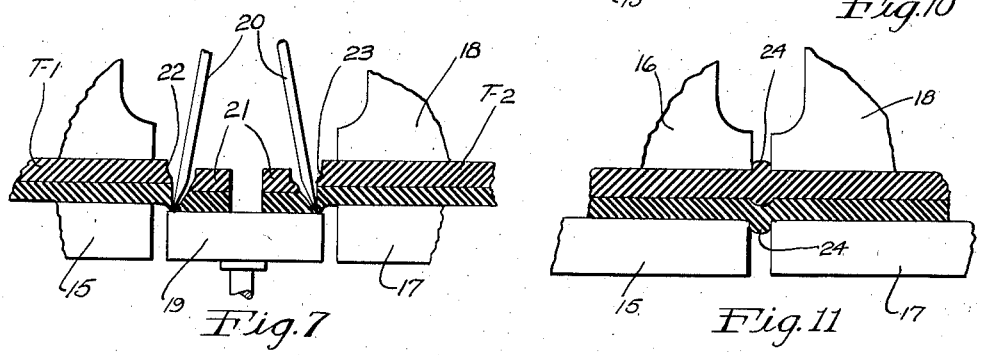
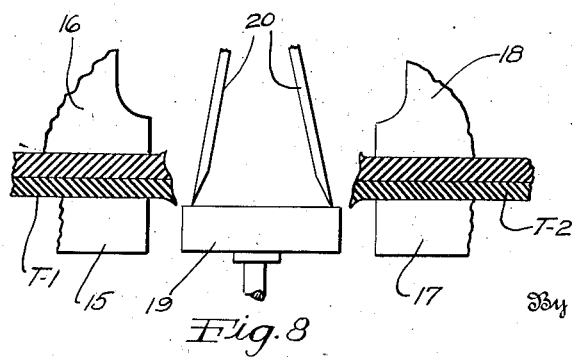

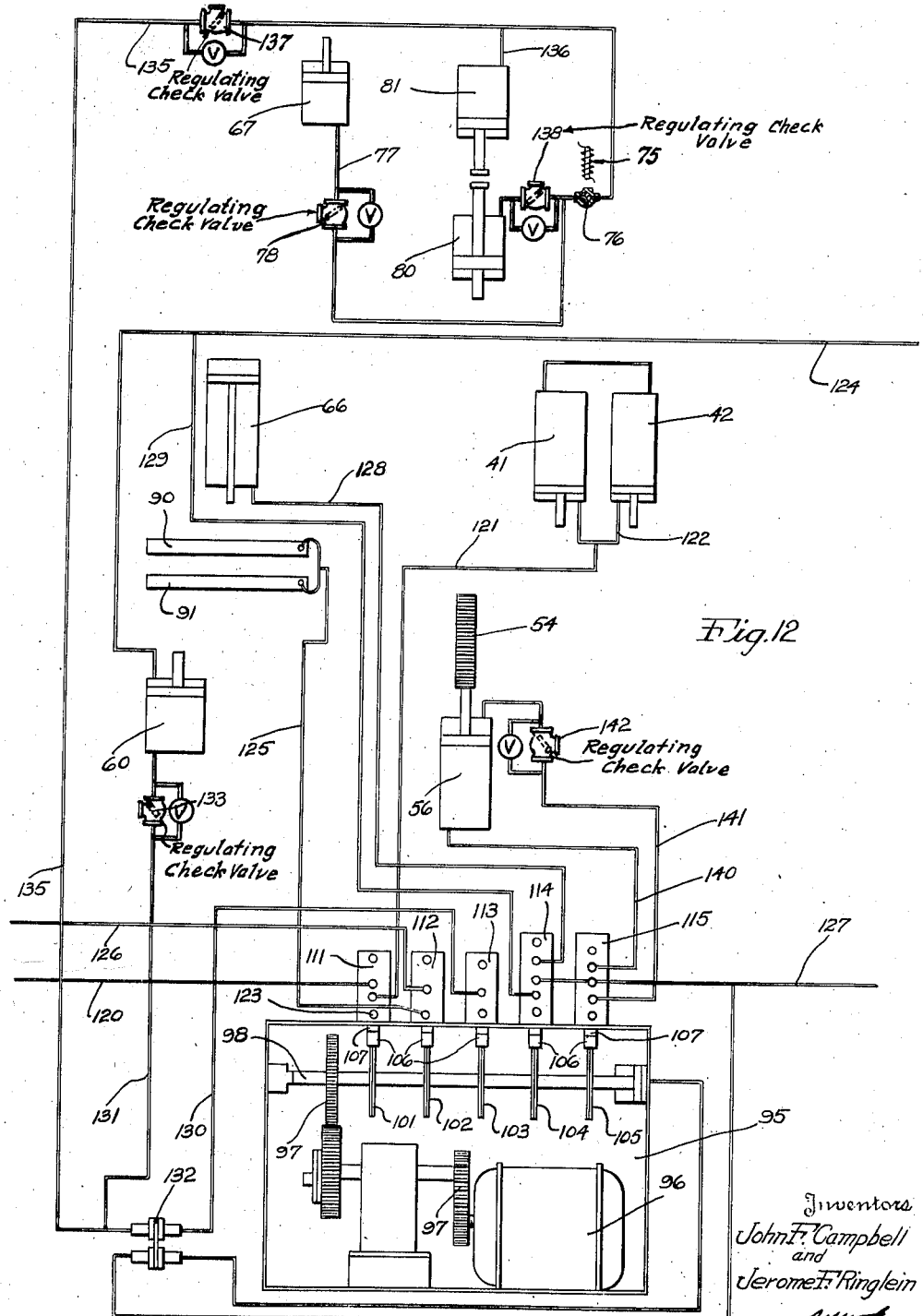

UNITED STATES PATENT OFFICE 2,273,464

METHOD OF SPLICING RUBBER ARTICLES

John F. Campbell, Cuyahoga Falls, and Jerome F. Ringlein, Akron, Ohio, assignors to Wingfoot Corporation, Wilmington, Del., a corporation of Delaware Original application February 4, 1939, Serial No. 254,722. Divided and this application April 25, 1940, Serial No. 331,576

7 Claims. (Cl. 154—14)

This invention relates to improvements in methods of splicing rubber articles, and it refers more particularly to such methods for use in joining ends of unvulcanized inner tube and tread stock. This application is a division of application Serial No. 254,722, filed February 4, 1939.

Prior to this invention, unvulcanized inner tube and tread stock has been spliced by the methods and machines disclosed in U. S. Letters Patent Nos. 2,024,577; 2,024,578; and 2,040,466. While those methods and machines have been extensively used with great commercial success, they are improved by the present invention. In practicing the inventions of the above-enumerated patents, two ends of the inner tube stock or the tread stock, as the case may be, are clamped flat in a pair of alined clamping devices, and while so held, said ends are cut off transversely and heated. Thereafter the freshly cut ends are brought forcibly together and joined preparatory to vulcanization. The cutting has been done with heated knives traveling in a straight line, the heat from the knives enhancing the tackiness of the stock to insure a good union. Instead of effecting a transversely straight cut as in the prior art, the present invention contemplates substantially oblique cuts or off-set cuts, so that when the cut ends are brought together they will first contact at one edge, and continued pressure will result in progressive contact without entrapping any air between the joined surfaces. Preferably sufficient pressure is exerted to form fins of excess material around the joint, thus giving greater strength thereto.

One of the objects of the invention is to provide a novel method for cutting the ends of the rubber stock to effect the improved splice or joint referred to above.

Another object of the invention is to provide a complete splicing method which includes the novel method steps.

More specifically the invention contemplates completely flattening and holding flat the ends of the tube stock or tread stock to be spliced and cutting portions from the ends so held, the line of cut being generally oblique with reference to the plane of the material. In one form of the invention the material is held flat in a pair of clamps which are movable toward and from each other and, by moving said clamps slightly away from each other during the cutting operation, the line of the cut is changed. In one respect this effects a combined cutting and tearing action on the rubber and it provides a certain amount of excess material for the splice, as will hereinafter be better appreciated. The cutting may be done with knives which preferably are heated to a predetermined temperature and, by changing the line of cut during the cutting operation, these heated knives are less likely to sear the rubber and therefore they leave the freshly cut ends of the rubber in better condition for splicing. After the cutting operation has been completed the clamps are moved toward each other in such a way as to force the freshly cut ends of rubber into progressive mutual contact forming a perfect splice without any air being trapped between the joined surfaces. The pressure with which the ends of the rubber are brought together is sufficient to leave slight fins of excess material surrounding the splice, this excess material further contributing to the perfection of the joint.

The foregoing and other objects, features and advantages of the invention will be fully appreciated from the following description in connection with the accompanying drawings, wherein the method has been illustrated diagrammatically and one form of apparatus has been shown for practicing the method. In the drawings:

Fig. 3 is a complete elevation of one side of the machine with the clamping means in clamping position but without showing any stock being operated upon.

Fig. 4 is a rear view thereof.

Figs. 5—11, inclusive, are fragmentary diagrammatic views similar to each other but illustrating successive steps in the novel method of splicing.

Figure 13:
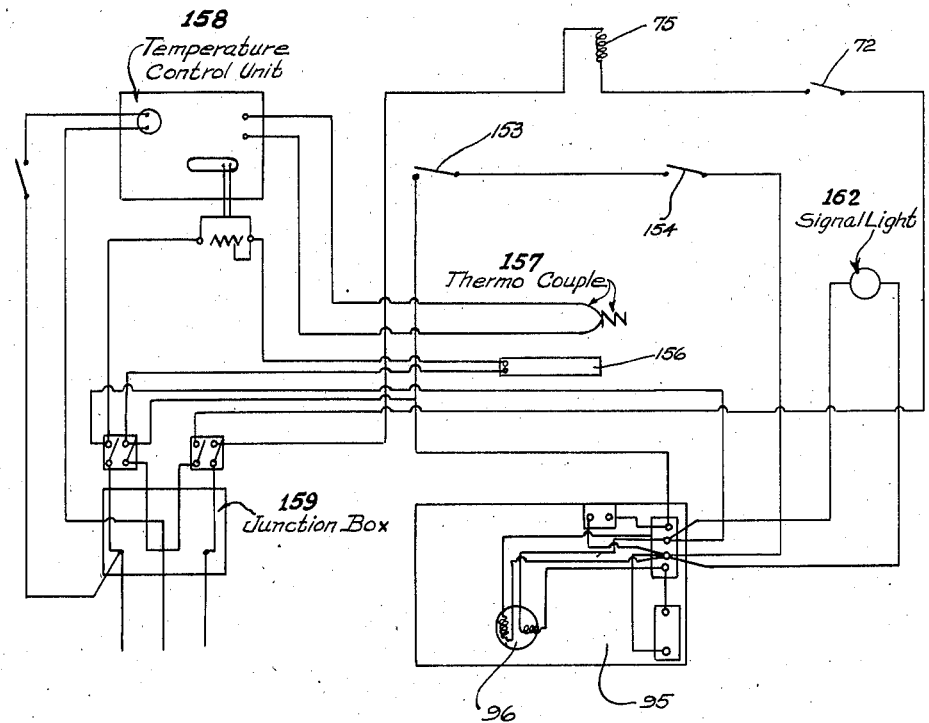

Fig. 12 is a diagrammatic view of the various fluid pressure cylinders and controlling means therefor, and Fig. 13 is a wiring diagram of the electrical connections for the machine.

Referring first to Figs. 5 to 11, inclusive, the method will be described and it is to be understood that various forms of apparatus may be employed for practicing such method. In the illustrated embodiment the ends T—1 and T—2 of unvulcanized rubber tube stock are flattened and held respectively between clamping members 15, 16 and 17, 18, said clamping members holding the ends of the tube in relative alinement and in spaced-apart relation. An anvil 19 is disposed between the clamping members 15 and 17 and directly below the protruding ends of the rubber tube stock. Cutting means such as a pair of knives 20 are moved downwardly toward the anvil 19 with their sharp ends entering the upper flattened wall of the tube stock. After the knives 20 have penetrated the tube stock a predetermined distance substantially equivalent to that shown in Fig. 5, their downward movement is interrupted and, while so interrupted, the clamping members 15 and 17 and their associated parts are moved away from each other a very slight distance. To a certain extent this action either tears or distorts the rubber as illustrated in Fig. 6. Thereafter the downward movement of the knives 22 continues entirely through the rubber as shown in Fig. 7, thus removing from the extremities of the tube stock small portions 21 which are not needed and exposing freshly cut surfaces 22 and 23 which are subsequently to be joined. After the cuts are thus completed the clamping members move farther apart so as to completely disengage the rubber from the knives as shown in Fig. 8 and thereafter the knives 20 return upward while the anvil 19 moves downward. It is to be noted that the freshly cut surfaces 22 and 23 of the rubber stock are substantially oblique with reference to the flattened plane of the tube stock, and this is important in effecting a perfect splice. While the tube stock is still held in flattened condition, the end surfaces 22 and 23 are brought forcibly together as shown in Fig. 10. Due to the obliquity of the end surfaces contact will first be made adjacent the lower edges of the stock and thereafter continued force or pressure will bring the surfaces 22 and 23 progressively into mutual engagement in such a way as to prevent entrapping of air between such surfaces. Preferably the ends of the tube stock are pressed together sufficiently to form fins 24 of excess material surrounding the joint as shown in Fig. 11. The ends of the tube stock thus pressed together become perfectly united by reason of their tacky condition and they remain so united in subsequent handling, and they become completely merged in vulcanization. Incidentally when the tubes so spliced are vulcanized in a confining mold, as is customary, the fins 24 of excess material substantially disappear by reason of the flow of heated rubber inwardly from the mold surface, some of such excess rubber distributing itself in the wall of the tube and some remaining to form a slight bulging portion on the interior of the tube and surrounding the splice.

Experience has shown that splices made by this method are superior to those of the prior patents previously referred to and that they can easily be carried out in large production schedules with a minimum number of defects. It is to be noticed that when the ends are severed by a combined cutting and tearing action, as illustrated in Figs. 5, 6 and 7, the first-cut portions of the surfaces 22 and 23 are quickly moved away from the knives 20 and thus they are not so likely to become seared as would otherwise be the case when the knives are heated. The nature of the rubber is such that the line of cut can easily be changed, as has been described, but obviously the method may also be practiced by moving the knives in oblique paths rather than perpendicular to the clamped rubber stock.

When splicing inner-tube stock the interior of the tube stock is quite heavily dusted with soapstone or other material to prevent the rubber walls from adhering to each other and when this method is used with the offset cut above described it is preferable to make the offset before the knives have gone entirely through the first wall of rubber. Thus, as they pass through the layer of soapstone between the superimposed faces of rubber, the knives will not disturb the soapstone sufficiently to interfere with the tackiness of the end below said layer of soapstone. It is of course to be understood that, while the method has been illustrated and described particularly in reference to splicing inner-tube stock, it is equally adaptable and effective for splicing other rubber material, such as tread bands for use in manufacturing pneumatic tires.

One form of apparatus for practicing the above-described method is illustrated in Figs. 1–4, inclusive, such apparatus including the principal features of the above-identified patents, together with certain additional features which are of the essence of the present invention. In these views of the drawings it will be seen that the lower clamping members 15 and 17 are respectively arranged upon a pair of alined carriages 30 and 31 which are mounted for movement endwise toward and from each other on dovetailed guides 32 and 33. The upper clamping members 16 and 18 are also arranged upon the carriages 30 and 31 so as to be bodily movable therewith but they are pivoted as at 34 to facilitate their movement into and out of clamping positions. Preferably the clamping members 16 and 18 comprise a multiplicity of yieldably mounted metal plates which at least partly encircle an inflatable core or airbag, the construction being substantially the same as that described and claimed in the Christy Patent 2,040,466. Clamps of this type are quite flexible and thus they conform readily to the contour of the particular material which is being operated upon in the machine. Lever arms 35 and 36 extend rearwardly from the upper clamping members 16 and 18 for swinging movement about the pivotal connection 34, whereby to actuate said clamping members. The rearward ends of said lever arms 35 and 36 are respectively connected at 37 and 38 with the lower ends of piston rods 39 and 40 which carry pistons operable within fluid pressure cylinders 41 and 42. These fluid pressure cylinders have their upper ends pivoted at 43 and 44 to a pair of goose-neck extensions 45 and 46 which rise from the rearward sides of the carriages 30 and 31. By admitting pressure fluid alternately to opposite ends of the cylinders 41 and 42 the lever arms 35 and 36 are caused to rock or swing about the pivotal connection 34 to raise and lower the upper clamping members 16 and 18. In order to actuate the carriages 30 and 31 for movement toward and from each other there are provided a pair of rack bars 48 and 49 which may be attached to or integral with the lower portions of the carriages. These rack bars are constantly in mesh with pinions 50 and 51 which are mounted for rotation with and by gears 52 and 53, said gears being mounted at the rearward side of the machine and being constantly in mesh with a double-face rack bar 54 disposed between them. The rack bar 54 is movable upwardly and downwardly by reason of its connection with a piston rod 55 which extends into a pressure cylinder 56 and wherein there is a piston attached to the end of said piston rod 55. As pressure fluid is admitted alternately to opposite ends of the cylinder 56, the double-face rack bar 54 is caused to move longitudinally, rotating the gears 52 and 53 and the pinions 50 and 51, and as the pinions thus rotate the carriages 30 and 31 and their associated parts are caused to move either toward or away from each other, dependent upon which end of the cylinder 56 has the pressure in it.

The anvil 19 (best shown in Fig. 1) comprises a relatively flat metallic block or plate which is movable upwardly and downwardly into and out of the path of relative movement of the clamping members 15 and 17. When the anvil is in its uppermost position it is disposed between the ends of the clamping members 15 and 17 and directly below the protruding ends of the stock clamped therein, and it is so proportioned as to give support to the clamped ends of the stock when said stock is being operated upon by the knives 20. The anvil 19 is mounted upon the upper end of a piston rod 59, the lower end of which extends into a pressure cylinder 60 wherein there is a reciprocating piston of any ordinary or preferred form. As pressure fluid is admitted to the lower end of said cylinder 60 the anvil is raised and as such pressure is released from the lower end of the cylinder the anvil is moved downwardly out of the path of the lower clamping members and carriages.

The knives 20 having sharpened lower cutting edges are mounted above the clamping members upon a slide 62, which slide is guided for vertical movement in an upward extension 63 of the machine frame. This extension 63, as well as the parts previously described, are supported upon a suitable frame or base 64 of any preferred form. The slide 62 is appropriately secured to the lower end of a piston rod 65 which extends into a pressure cylinder 66 wherein there is another reciprocating piston for actuating the piston rod. The pressure cylinder 66 is fixed to the frame extension 63 substantially in the vertical center line of the machine and below another pressure cylinder 67 which is supported upon a fixed cross bar 68 adjacent the top of the frame. Within the cylinder 67 there is a piston attached to an upwardly projecting piston rod 69 which is disposed in the path of movement of an adjustable abutment 70 which also has associated with it an extension 71 adapted at certain times to strike against and to actuate a normally open micro switch 72. The abutment 70 and the extension 71 are carried on a cross arm 73 secured to the upper end of a pair of sliding rods 74 which are suitably guided in the upper portion of the frame and secured to the slide 62.

When the cutting knives 20 are in their uppermost position (inactive) the abutment 70 and its associated parts are also in their uppermost positions and thus held by fluid pressure in the lower end of cylinder 66. At the same time fluid under pressure is present in the lower end of cylinder 67. When it is desired to lower the knives for the cutting operation pressure is released from the lower end of cylinder 66 and admitted to the upper end of said cylinder, thus causing the slide 62 and its associated parts, including the rods 74 to move downwardly toward the anvil 19. In the course of such movement the abutment 70 will come into contact with the projecting end of the piston rod 69 and this will temporarily stop the descent of the knives. At substantially the same time the extension 71 will contact the micro switch 72, closing an electric circuit therethrough to energize a solenoid 75 which controls a normally open three-way valve 76. As the valve 76 is thus actuated the pressure fluid is slowly released from the lower end of cylinder 67 through a suitable conduit 77 and regulating check valve 78. As this occurs the slide 62 and its associated parts is free to move downwardly again under the pressure existing in the upper end of cylinder 66 until the knives 20 complete their movement entirely through the rubber held in the clamping members 15, 16, 17 and 18.

Two additional pressure cylinders 80 and 81 are also secured to the rearward side of the frame extension 63, these cylinders being relatively coaxial and in vertical alinement with the cylinder 56 previously described. A piston rod 82 extends entirely through the cylinder 80 and is provided intermediate its ends with a piston which is adapted to reciprocate in said cylinder. The lower end 83 of the piston rod 82 is adapted for abutment with the upper end 84 of the rack bar 54. Similarly the upper end 85 of the piston rod 82 is adapted for abutment at certain times with the lower end 86 of a piston rod 87 which extends into the cylinder 81 for connection with a piston therein. Under certain conditions the end portions 85 and 86 are out of contact with each other but in other conditions they are in mutual contact for simultaneous operation during part of the cycle of the machine. The function of the cylinders 80 and 81 and their associated parts is to cooperate with the cylinder 56 in controlling movement of the carriages 30 and 31 and it is to be noted that the diameters of said cylinders 80 and 81 are greater than that of the cylinder 56, whereby to overpower the latter during part of the cycle.

Figures 1, 2:
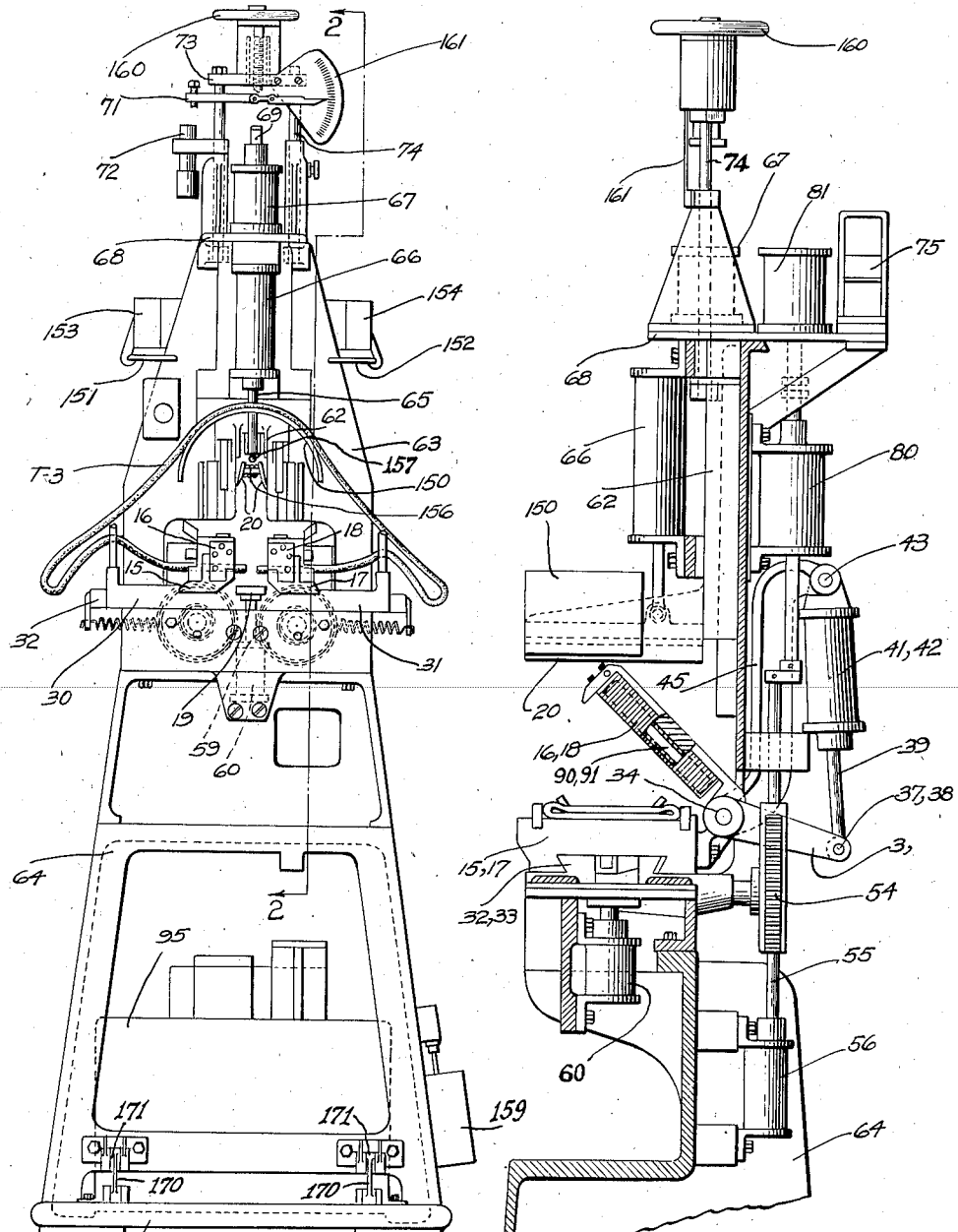
Fig. 1 is a front elevation of the improved splicing machine with the parts shown in their respective positions at the beginning of the cycle of operations.
Fig. 2 is a fragmentary view on a larger scale partly in section and partly in elevation, the view being taken approximately on line 2—2 of Fig. 1.

When the machine is at rest, that is ready to commence its cycle of operations, the clamping members 16 and 18 are raised as shown in Fig. 2 and the piston within the cylinder 56 is near the upper end of the cylinder but not up to its limit of movement. At the same time the members 83 and 84 are in contact with each other and the members 85 and 86 are out of contact, and the pistons which control said respective members are substantially in the lower ends of the cylinders 80 and 81. At this same time the air bags 90 and 91 within the clamping members 16 and 18 are deflated.

Pressure fluid, such as compressed air, is admitted to and released from the opposite ends of the various cylinders automatically by a control unit 95. (See Figs. 3, 4 and 12.) This control unit may preferably be mounted in the base 64 of the machine and comprises a suitable casing which encloses an electric motor 96 which, through suitable gearing 97, drives a cam shaft 98. A plurality of cams 101, 102, 103, 104 and 105 are secured to the cam shaft 98 for rotation therewith and they are adapted to have their peripheries engage against a corresponding number of cam followers designated generally by the reference character 106. These cam followers 106 may be of any ordinary or preferred forms and preferably they are all similar to each other and are mounted for actuation of plungers or rods 107 which extend through the upper wall of the casing and extend thereinto from a multiplicity of valves 111, 112, 113, 114 and 115. The valves just referred to may be of the type known commercially as "Quick-as-Wink" and are characterized by individual casings within which plunger rods are operable to open and close connections between a plurality of different fluid ports which in turn are connected with appropriate piping to the various cylinders, valves, fluid supplies and atmosphere, as the case may be. Thus, as the cam shaft 98 is rotated by motor 96 through gearing 97, the cams 101–105, inclusive, will slide the plunger rods 107 upwardly and downwardly at suitable times predetermined in the designing of the cams and thus operate the valves 111–115, inclusive.

In order to simplify the machine drawings Figs. 1–4, inclusive, the piping and valves have not been shown thereon but such piping and valves are shown diagrammatically in Fig. 12. Fluid pressure, for example compressed air at 200# per square inch, is supplied through a pipe 120 to the inlet port of valve 111. Under suitable control of the corresponding plunger 107 the air so supplied to valve 111 will at times be delivered through a pipe or conduit 121 and flexible branches 122 to the clamping arm cylinders 41 and 42, thus to supply pressure fluid to the lower ends of said cylinders whereby to move the clamps 16 and 18 downwardly to their clamping positions. On other occasions such air may be exhausted from the cylinders 41 and 42 through an appropriate exhaust port 123. When the cycle commences that movement of the clamping members 16 and 18 is the first that occurs and the clamping which is thus effected is maintained until the splice has been completed. As a cushioning means the upper ends of the cylinders 41 and 42 are connected to a low-pressure fluid-supply line 124 which may carry, for example, compressed air at from 25 to 35# per square inch pressure.

The valve 112 supplies pressure fluid through a conduit 125 to the air bags 90 and 91 within the clamping members 16 and 18. This pressure fluid may also be compressed air but preferably at selectively variable pressure to suit the particular splicing operations. This pressure-supply line is indicated at 126 extending into valve 112.

Valve 114 receives fluid pressure, such as compressed air, at approximately 150# per square inch from a supply pipe 127 and it distributes such fluid alternately to opposite ends of the knife cylinder 66 through conduits or pipes 128 and 129.

Valve 113 also receives pressure fluid from the line 127 and valve 114, and it distributes such pressure fluid to the lower end of the anvil cylinder 60 through conduits or pipes 130 and 131 which, incidentally, are also connected with safety valves 132 and the regulating check valve 133. The valve 133 also supplies pressure fluid to the knife-stop cylinder 67 and to supplementary carriage-control cylinders 80 and 81, such supply passing through pipes 135 and branch 136, regulating check valves 137 and 138 as well as the three-way valve 76, pipe 77 and regulating check valve 78 previously mentioned.

The valve 115 also receives its supply of fluid from the tube 127 and distributes it alternately to the opposite ends of the primary carriage-control cylinder 56 through pipes 140 and 141 and regulating check valve 142.

The relative positions of the various pistons when the machine is at rest have already been described, and from such positions they are moved automatically in proper sequence under the control of the unit 95. Variations in the cams may be made for specific adjustments of parts of the machine, and the total duration of the cycle may be varied by changing the speed of the cam shaft 98. The cycle just referred to includes all of the steps illustrated in Figs. 5 to 11, inclusive, and it is to be understood that all of the machine parts at the end of the cycle come to rest in the same positions from which they started.

In operating the machine the attendant merely lays the intermediate portion T—3 of the unvulcanized inner tube or other stock over a suitable support 150, which is disposed above the clamping devices and then places the ends T—1 and T—2 of such stock on top of the clamping members 15 and 17, leaving the extremities protruding therefrom. Thereafter the attendant grasps the switch handles 151 and 152 (requiring both hands), and manipulates them to close switches 153 and 154, which switches are arranged in series with each other and supply electric current to operate the motor 96. As soon as the motor turns sufficiently to start the cam shaft 98 in its single revolution the current is automatically by-passed around the switches 153 and 154 but in the meantime the clamping members 16 and 18 will have moved down into clamping position and thereafter the operator or attendant will be in no danger of being injured by the machine. If anything should go wrong he needs merely to kick inwardly a safety bar 155 which extends transversely across the front of the base 64 adjacent to the floor line and said safety bar, through its operative connections, will immediately interrupt the cycle of operations and return all of the machine parts to their original positions of rest, except the anvil 19 which is lowered, and the carriages 30 and 31 which are moved apart their full distance. The operative connections of the safety bar 155 may be variously arranged and modified as desired. In the illustrated embodiment, the bar 155 is supported by the lower ends of a pair of arms 170 which are pivoted at 171, and which are connected by a link 172 to a lever 173 disposed within the base of the machine. The lever 173 is adapted to actuate a master control valve 174 to move the parts to their positions of rest as above described. It is to be understood that the bar 155 and associated parts are not used in normal operation of the machine, but are provided only as a safety measure in the event that the operator should accidentally or carelessly have his hands caught in the machine.

Preferably the knives 20 will be heated by an appropriate heating element 156 which is mounted between them upon the slide 62, such heating element being supplied with electric current and thermostatically controlled at any desired temperature by a thermocouple 157 of any ordinary or preferred construction.

The abutment 71 may be adjusted by means of a hand wheel 160 whereby to set the machine for operation on stocks of different thickness and preferably a gauge or indicating mechanism 161 is mounted in association with the adjusting mechanism for guidance of the attendant. A signal light 162 may be included in the operating circuit, it being so connected that it will receive current and be lighted at the beginning of the cycle and will continue to be lighted until the very end of the cycle. This signal light does not in any way affect or modify the operation of the machine, but is intended for the convenience of the machine attendant. A temperature-control unit 158 is also preferably used, such unit being commercially available in several different forms and being ordinarily mounted upon a wall or instrument panel at some convenient location of the shop, not necessarily immediately adjacent to the machine. This temperature control unit, as well as the power-supplying wires may be conveniently connected to a junction box 159 located on or adjacent to the base of the machine.

From the foregoing description it will be evident that a novel method has been provided for splicing pieces of rubber together and more particularly for splicing inner-tube stock and tread stock in unvulcanized condition. Also novel mechanism has been provided for practicing the method. The method is one which produces superior results and the apparatus is relatively simple, efficient and conducive to economy. Obviously numerous changes may be made in the steps of the method and in the arrangement of parts of the apparatus and the right is herein reserved to make such changes as fall within the scope of the appended claims without departing from the spirit of the invention.

What we claim is:

1. A method of splicing two portions of rubber which comprises cutting substantially obliquely the surfaces of rubber to be joined, and bringing the freshly cut surfaces together with transversely progressive contact.

2. A method of splicing two portions of rubber which comprises cutting transverse off-set surfaces on the rubber to be joined, and bringing the freshly cut surfaces into progressive mutual contact.

3. A method of splicing two portions of rubber which comprises clamping the rubber in flat condition with protruding ends, cutting said protruding ends with a hot knife, offsetting the line of cut of the knife as it cuts through the rubber, and forcing the freshly cut ends of the rubber into progressive mutual contact with fins of excess material at the joint so formed.

4. A method of splicing a rubber inner tube which comprises flattening the ends of the tube and holding them flat, cutting the so-held ends substantially obliquely, and forcing the so-cut ends together into progressive contact.

5. A method of splicing a rubber inner tube which comprises completely flattening the ends of the tube, removing portions from the ends of the tube in such manner as to leave the ends tacky and transversely off-set, and then forcing said tacky ends of the tube together into complete contact.

6. A method of splicing a rubber inner tube which comprises completely flattening the ends of the tube, cutting partly through one of the flattened walls of the tube, then offsetting the line of such cut and continuing it through the remainder of the tube, and forcing the so-cut ends of the tube together into complete contact.

7. A method of splicing an unvulcanized rubber inner tube which comprises clamping the ends of the tube in flat condition, cutting the clamps through one wall of the tube, moving the clamps slightly apart from each other without releasing them, continuing the cut through the rest of the tube leaving off-set portions on the cut ends, heating the so-cut ends, and forcing the ends together into complete contact sufficiently to form fins of excess material at the joint.

JOHN F. CAMPBELL.
JEROME F. RINGLEIN.